(12) United States Patent
Okumura et al.

(10) Patent No.: US 9,080,531 B2
(45) Date of Patent: Jul. 14, 2015

(54) CYLINDER STRUCTURE FOR INTERNAL COMBUSTION ENGINE

(75) Inventors: Hideaki Okumura, Tokyo (JP); Kimihiko Maehata, Tokyo (JP); Yuta Furukawa, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 0 days.

(21) Appl. No.: 14/003,330

(22) PCT Filed: Sep. 30, 2011

(86) PCT No.: PCT/JP2011/072640
§ 371 (c)(1),
(2), (4) Date: Sep. 30, 2013

(87) PCT Pub. No.: WO2012/132070
PCT Pub. Date: Oct. 4, 2012

(65) Prior Publication Data
US 2014/0014058 A1    Jan. 16, 2014

(30) Foreign Application Priority Data
Mar. 31, 2011    (JP) .................................. 2011-080417

(51) Int. Cl.
*F01L 5/00*    (2006.01)
*F02F 3/00*    (2006.01)
(Continued)

(52) U.S. Cl.
CPC ... *F02F 1/24* (2013.01); *F01L 1/32* (2013.01); *F01L 3/06* (2013.01); *F01L 3/08* (2013.01);
(Continued)

(58) Field of Classification Search
CPC ................ F01L 1/00; F01L 35/04; F01L 7/04
USPC ........... 123/193.1–193.5, 188.4, 188.5, 79 R, 123/90.27
See application file for complete search history.

(56) References Cited

U.S. PATENT DOCUMENTS 2,123,302 A * 7/1938 Groth ............................. 123/315
2,814,283 A * 11/1957 Gassmann et al. ......... 123/90.24
(Continued)

FOREIGN PATENT DOCUMENTS

| | | |
|---|---|---|
| CN | 101160457 | 4/2008 |
| GB | 1 233 676 | 5/1971 |

(Continued)

OTHER PUBLICATIONS

International Search Report issued Nov. 22, 2011 in corresponding International Application No. PCT/JP2011/072640.
(Continued)

*Primary Examiner* — Hung Q Nguyen
*Assistant Examiner* — Tea Holbrook
(74) *Attorney, Agent, or Firm* — Wenderoth, Lind & Ponack, L.L.P.

(57) ABSTRACT

A cylinder structure satisfies the following conditions: $12\% \leq d/a \leq 27\%$, where d is a distance between a cylinder inner surface 12a and an exhaust valve member 20b, and a is a diameter of the exhaust valve member; $40\% \leq c/b \leq 50\%$, where c is a length of a non-guided portion of the exhaust valve 20 located below a lower end of a sleeve 26 when the exhaust valve 20 is closed, and b is a diameter of a cylinder bore; and $0.5\% \leq e/S \leq 0.8\%$, where e is a gap between an exhaust valve rod 20a and the sleeve 26 and S is a diameter of the exhaust valve rod 20a.

1 Claim, 3 Drawing Sheets

(51) Int. Cl.
*F02F 1/42* (2006.01)
*F02F 1/24* (2006.01)
*F01L 3/06* (2006.01)
*F01L 3/08* (2006.01)
*F01L 1/32* (2006.01)
*F01L 1/14* (2006.01)
*F01L 1/16* (2006.01)
*F01L 1/18* (2006.01)
*F01L 1/46* (2006.01)

(52) U.S. Cl.
CPC .. *F01L 1/146* (2013.01); *F01L 1/16* (2013.01); *F01L 1/181* (2013.01); *F01L 1/462* (2013.01); *F01L 2820/01* (2013.01); *Y02T 10/146* (2013.01)

(56) References Cited

U.S. PATENT DOCUMENTS

| | | | | |
|---|---|---|---|---|
| 3,503,375 | A * | 3/1970 | Thompson | 123/188.3 |
| 4,224,918 | A | 9/1980 | Tanaka et al. | |
| 5,065,711 | A * | 11/1991 | Lesley | 123/188.4 |
| 5,230,310 | A * | 7/1993 | Hashimoto | 123/188.8 |
| 5,749,341 | A * | 5/1998 | Hosaka et al. | 123/90.35 |
| 6,000,372 | A * | 12/1999 | Moser | 123/193.5 |
| 6,408,803 | B1 * | 6/2002 | Atkins | 123/41.81 |
| 6,675,760 | B1 * | 1/2004 | Gahrken et al. | 123/193.5 |
| 6,691,663 | B2 * | 2/2004 | Tsukui et al. | 123/188.9 |
| 2001/0047782 | A1 * | 12/2001 | Imai et al. | 123/90.34 |
| 2002/0152974 | A1 * | 10/2002 | Sugawara | 123/90.15 |
| 2005/0155561 | A1 * | 7/2005 | Atkins | 123/41.81 |

FOREIGN PATENT DOCUMENTS

| | | |
|---|---|---|
| GB | 2 342 954 | 4/2000 |
| JP | 55-132339 | 9/1980 |
| JP | 2-130206 | 5/1990 |
| JP | 6-34101 | 5/1994 |
| JP | 6-37507 | 5/1994 |
| JP | 9-14047 | 1/1997 |
| JP | 11-159396 | 6/1999 |
| JP | 2001-234715 | 8/2001 |
| JP | 2011-127577 | 6/2011 |
| WO | 2011/077686 | 6/2011 |

OTHER PUBLICATIONS

International Preliminary Report on Patentability and Written Opinion of the International Searching Authority issued Oct. 2, 2013 in corresponding International Application No. PCT/JP2011/072640.
Office Action issued May 1, 2013 in corresponding Japanese Application No. 2011-080417 (with English translation).
Decision to grant a patent issued Jul. 16, 2013 in corresponding Japanese Application No. 2011-080417 (with English translation).
Notice of Allowance issued Oct. 31, 2014 in corresponding Korean patent application No. 10-2013-7025171 (with English translation).
Extended European Search Report issued Sep. 23, 2014 in corresponding European patent application No. 11862012.9.
Office Action issued Feb. 28, 2015 in corresponding Chinese patent application No. 201180069438.X (with English translation).

* cited by examiner

FIG.2

| TEST NO. | d/a (%) | c/b (%) | e/S (%) | IN-CYLINDER PRESSURE DROP DURING COMPRESSION STROKE | TEMPERATURE DROP OF EXHAUST GAS | NOTE |
|---|---|---|---|---|---|---|
| 1 | 5.0 | 51.0 | 0.78 | YES | YES | COMPARATIVE EXAMPLE |
| 2 | 5.0 | 51.0 | 1.05 | YES | YES | DITTO |
| 3 | 10.0 | 46.4 | 0.79 | YES | NO | DITTO |
| 4 | 12.9 | 46.4 | 0.79 | NO | NO | PRESENT INVENTION |
| 5 | 12.9 | 46.4 | 0.52 | NO | NO | DITTO |
| 6 | 12.9 | 51.0 | 0.57 | YES | NO | COMPARATIVE EXAMPLE |
| 7 | 26.4 | 40.0 | 0.52 | NO | NO | PRESENT INVENTION |
| 8 | 26.4 | 46.4 | 0.79 | NO | NO | DITTO |
| 9 | 12.9 | 46.4 | 0.42 | YES | NO | COMPARATIVE EXAMPLE |
| 10 | 12.9 | 46.4 | 0.93 | YES | NO | DITTO |

CYLINDER STRUCTURE FOR INTERNAL COMBUSTION ENGINE

TECHNICAL FIELD

The present invention relates to a cylinder structure that can prevent uneven wear on a valve member and a valve seat of an exhaust valve in an internal combustion engine.

BACKGROUND ART

In an intake or exhaust vale provided in a cylinder head of an internal combustion engine, the flow of intake air or combustion exhaust gas around the valve members becomes uneven when the intake or exhaust valve is opened. The uneven flow of gas applies a bending stress on the valve members, causing the valve members to contact the valve seats on one side only. Such one-sided contact causes uneven wear on the valve members and the valve seats. The uneven wear may lead to a flow leak between the intake or exhaust valve and the valve seat, in which case the intake or exhaust valve or the valve seat must be replaced.

The exhaust valve, in particular, tends to contact the valve seat on one side only, as it is exposed to high temperature combustion gas flowing therearound so that the valve member and the valve seat are prone to thermal deformation or thermal degradation. Uneven flow or scoring is also caused by carbonized fuel residue adhering on the valve member or the valve seat. Such carbonized substance adhering and depositing between a valve rod and a sleeve that slidably guides the valve rod will hinder smooth sliding of the valve rod.

Moreover, since the combustion gas passing through the exhaust valve has a higher pressure than the intake air through the intake valve, the exhaust valve is subjected to a high bending stress. This bending stress also causes the valve to contact the seat on one side only. Furthermore, when the combustion exhaust gas exits from the cylinder through the exhaust valve into the exhaust port, turbulence is easily generated because the lower surface of the exhaust valve member is not streamlined. Such turbulence also causes uneven flow of gas.

Patent Document 1 and Patent Document 2 disclose means of preventing uneven wear on an intake or exhaust valve and the valve seat in internal combustion engines. The means disclosed in Patent Document 1 is comprised of a plurality of circumferentially spaced grooves on the surface of a valve member facing the intake or exhaust port. Swirls of intake or exhaust gas passing through the intake or exhaust port are blown to these grooves to rotate the intake or exhaust valve by the turning motion of the swirls, to prevent uneven wear on the intake or exhaust valve and the valve seat.

The means disclosed in Patent Document 2 is built upon the design of a cylindrical sleeve that slidably guides an intake or exhaust valve. This means will be described below with reference to FIG. 3 (FIG. 1 of Patent Document 2). FIG. 3 shows an exhaust valve as one example. A cylindrical sleeve 104 is fixed inside the cylinder head 100. The valve rod 102a of the exhaust valve 102 is slidably guided in the sleeve 104. The valve member 102b of the exhaust valve 102 rests on a valve seat 106 by a resilient force of a coil spring (not shown), and moves away from the valve seat 106 by the action of a cam (not shown), thus opening and closing the exhaust port 108.

The sleeve 104 protrudes from the upper surface (reference surface) 100a of the cylinder head 100 by an amount $L_0$, which is more than twice the outer diameter of the valve rod, and the entire length $L_1$ of the sleeve is more than six times the outer diameter S of the valve rod. This restricts inclination of the valve rod 102a so that the exhaust valve 102 does not contact the valve seat 106 on one side only, whereby uneven wear on the exhaust valve 102 and the valve seat 106 is prevented.

Patent Document 1: Japanese Utility Model Application Laid-open No. H6-34101
Patent Document 2: Japanese Utility Model Application Laid-open No. H6-37507

If carbonized substance adheres on the valve rod or the valve seat, or deposits between the sleeve and the valve rod, the turning motion of swirls may not be sufficient to rotate the exhaust valve. Therefore, the means disclosed in Patent Document 1 cannot effectively be applied for exhaust valves.

The means disclosed in Patent Document 2 is not based on the fact that the uneven flow of intake air or combustion exhaust gas around the valve member is the major cause of uneven wear on the valve member or the valve seat. Thus, it does not provide a fundamental solution to prevent uneven wear.

SUMMARY OF THE INVENTION

In view of these problems in the conventional techniques, an object of the present invention is to prevent uneven wear in an internal combustion engine, which is particularly severe on the exhaust valve, to reduce the frequency of replacing the exhaust valve or its valve seat.

To achieve the object, the present invention provides a cylinder structure for an internal combustion engine having a cylinder head including an exhaust valve and a sleeve that slidably guides an exhaust valve rod, the cylinder structure satisfying the following conditions: $12\% \leq d/a \leq 27\%$, where d is a distance between an inner surface of the cylinder and an exhaust valve member and a is a diameter of the exhaust valve member; $40\% \leq c/b \leq 50\%$, where c is a length of a non-guided portion of the exhaust valve located below a lower end of the sleeve when the exhaust valve is closed, and b is a diameter of a cylinder bore; and $0.5\% \leq e/S \leq 0.8\%$, where e is a gap between the exhaust valve rod and the sleeve and S is a diameter of the exhaust valve rod.

The present inventors found out that unevenness in the flow around the exhaust valve member occurred in conventional cylinders because the distance d between the cylinder inner surface and the exhaust valve member was small. Therefore, in the present invention, the distance d is increased so that $12\% \leq d/a$, to prevent formation of an uneven flow. If the ratio d/a is to exceed 27%, the exhaust valve member need to have a smaller diameter and the cylinder bore need to have a larger diameter, which will render the cylinder unable to exhibit desired design performance. Thus the upper limit of d/a is 27%.

The ratio of the length c of the non-guided portion of the exhaust valve located below the lower end of the sleeve to the cylinder bore diameter b is set not to exceed 50% ($c/b \leq 50\%$), to shorten the non-guided region of the exhaust valve rod. This restricts inclination of the exhaust valve rod below the sleeve to prevent the exhaust valve member from contacting the valve seat on one side only. The ratio c/b being less than 40% means that the sleeve will protrude into the exhaust port, which will hinder the flow of the exhaust gas. Thus, the lower limit of c/b is 40%.

The ratio of the gap e between the exhaust valve rod and the sleeve to the outer diameter S of the exhaust valve rod is set in the range of $0.5\% \leq e/S \leq 0.8\%$. Reducing the gap e restricts inclination of the exhaust valve rod and prevents the exhaust valve member from contacting the valve seat on one side only. The ratio e/S being less than 0.5% means that the sleeve or the exhaust valve rod may suffer thermal deformation, or that carbonized substance or the like may deposit between the sleeve and the exhaust valve member, which may impede smooth sliding of the exhaust valve rod. Thus, the lower limit of e/S is 0.5%.

According to the present invention, the cylinder structure for an internal combustion engine having a cylinder head including an exhaust valve and a sleeve that slidably guides an exhaust valve rod satisfies 12%≤d/a≤27%, where d is a distance between an inner surface of the cylinder and an exhaust valve member and a is a diameter of the exhaust valve member; 40%≤c/b≤50%, where c is a length of a non-guided portion of the exhaust valve located below a lower end of the sleeve when the exhaust valve is closed, and b is a diameter of a cylinder bore; and 0.5%≤e/S≤0.8%, where e is a gap between the exhaust valve rod and the sleeve and S is a diameter of the exhaust valve rod. Therefore, there is less unevenness in the flow of combustion gas flowing around the exhaust valve member, which prevents the exhaust valve member from contacting the valve seat on one side only. Thus there will be no uneven wear on the exhaust valve member and the valve seat so that the exhaust valve member and the valve seat can have longer life and the frequency of replacing these components will be reduced.

BRIEF DESCRIPTION OF THE DRAWINGS

FIG. 2 is a table showing the results of a combustion test conducted on the cylinder head and (non-published) comparative examples.

BEST MODE FOR CARRYING OUT THE INVENTION

The illustrated embodiment of the present invention will be hereinafter described in detail. It should be noted that, unless otherwise particularly specified, the sizes, materials, shapes, and relative arrangement or the like of constituent components described in this embodiment are not intended to limit the scope of this invention.

Figure 1:
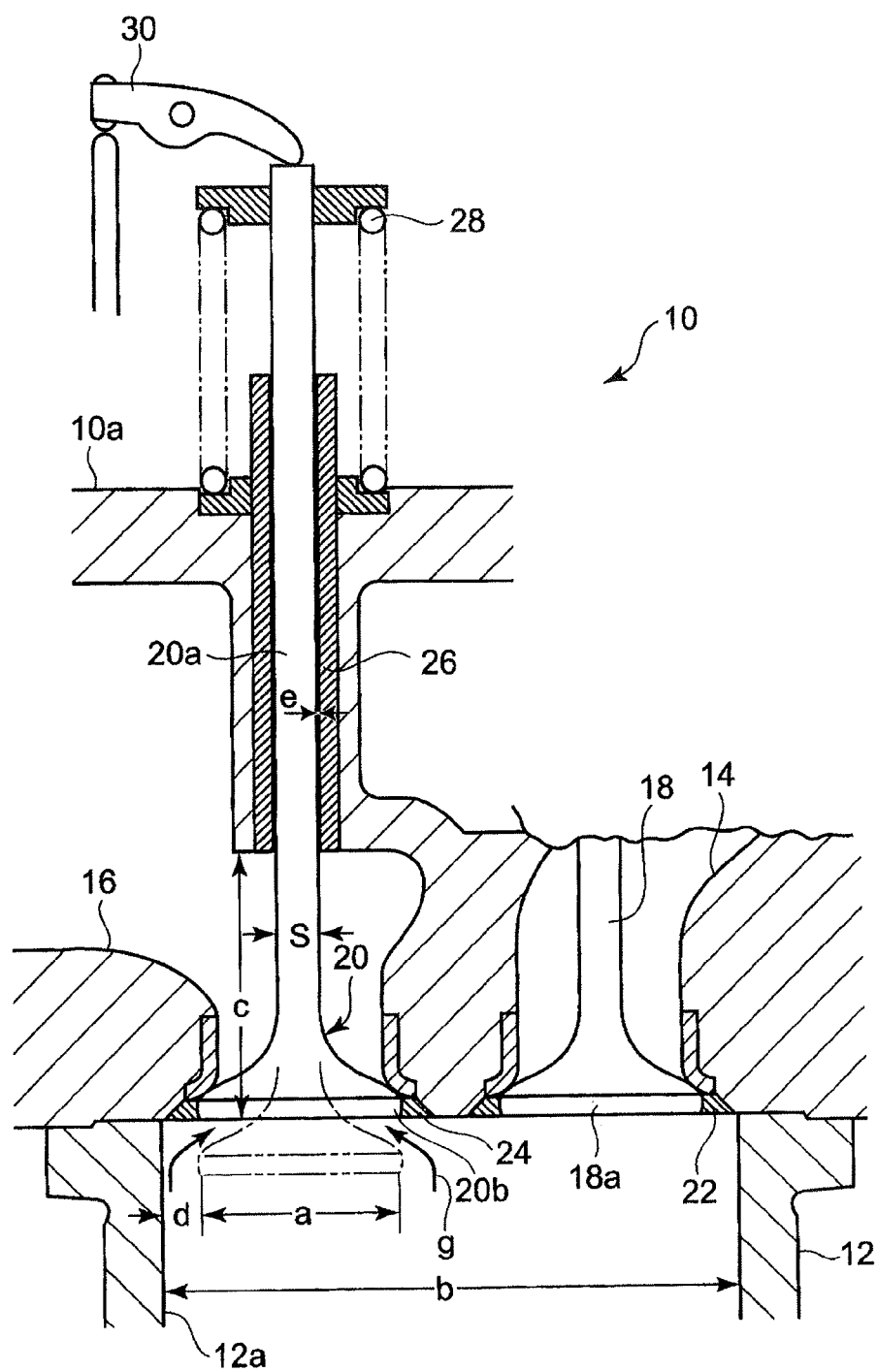
FIG. 1 is a cross-sectional view of a cylinder head according to one embodiment of the apparatus of the present invention.
Figure 3:
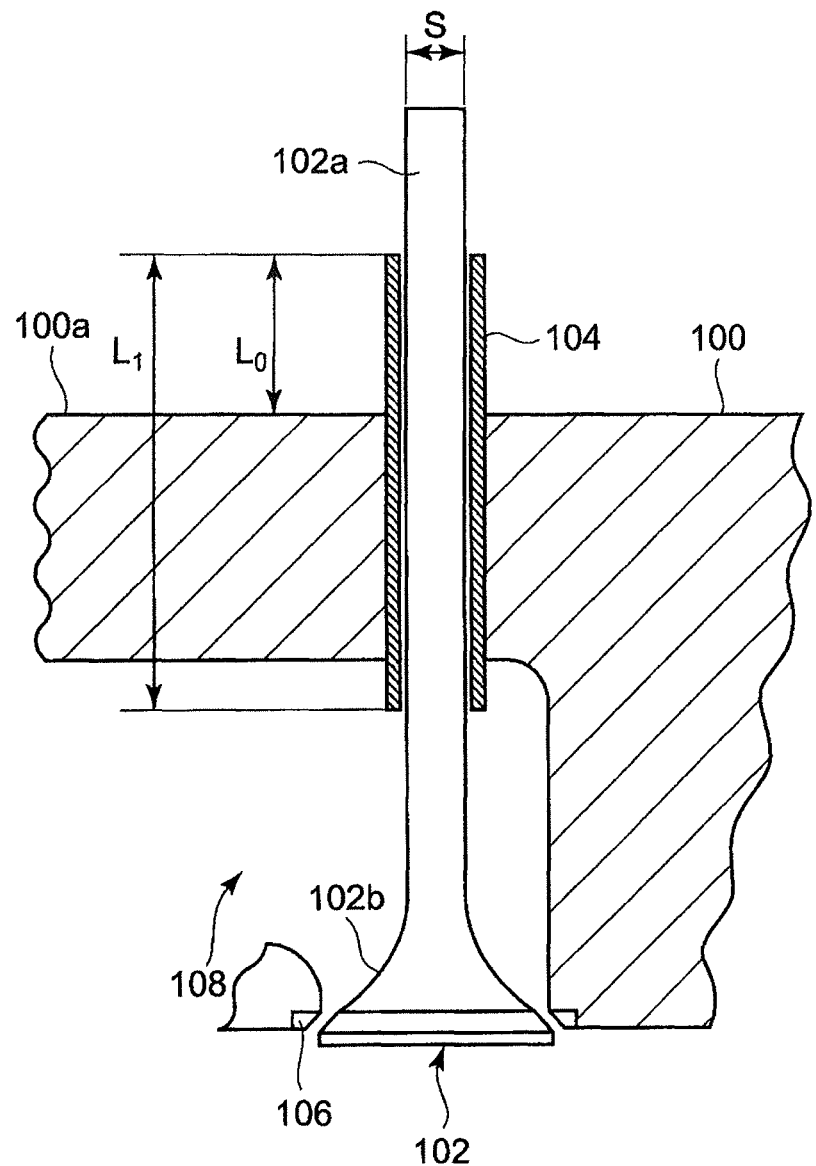
FIG. 3 is a cross-sectional view of a conventional cylinder head.

One embodiment of the apparatus of the present invention will be described with reference to experimental data and FIG. 1 and FIG. 2. FIG. 1 shows a cylinder head part of a diesel engine according to this embodiment. In FIG. 1, a cylinder head 10 is mounted on a cylinder 12. The cylinder head 10 has an intake port 14 and an exhaust port 16. The intake port 14 and the exhaust port 16 open into the cylinder bore, and an intake valve 18 and an exhaust valve 20 are mounted at these openings.

A valve seat 22 for a valve member 18a of the intake valve 18 to rest on, and a valve seat 24 for a valve member 20b of the exhaust valve 20 to rest on, are provided around the openings for the intake port 14 and the exhaust port 16. A cylindrical sleeve 26 is secured vertically in a hole drilled in a casing 10a of the cylinder head 10. An exhaust valve rod 20a is arranged inside the sleeve 26 such as to be slidable.

A coil spring 28 disposed on the upper surface of the casing 10a applies a resilient force on the exhaust valve member 20b so that the valve member rests on the valve seat 24 to close the exhaust port 16. To open the exhaust port 16, a rocker arm 30 is operated to move the exhaust valve rod 20a downward. The intake valve 18 has a similar open/close mechanism.

In this embodiment, the distance d between the cylinder inner surface 12a and the exhaust valve member 20b is made larger than that of conventional designs, so that the ratio of the distance d to the diameter a of the exhaust valve member 20b is equal to or more than 12% (12%≤d/a). This allows the combustion exhaust gas g flowing around the exhaust valve member 20b to flow uniformly around the exhaust valve member 20b when the exhaust valve 20 is opened. The ratio d/a exceeding 27% means that the exhaust valve member 20b need to have a smaller diameter a and the cylinder bore need to have a larger diameter b. The cylinder 12 could then not exhibit desired combustion performance. Thus the upper limit of d/a is 27%.

The length c of a non-guided portion of the exhaust valve rod 20a located below the lower end of the sleeve 26 when the valve is closed is made shorter than that of conventional designs, so that the ratio of this length c to the cylinder bore diameter b does not exceed 50% (c/b≤50%). This restricts inclination of the exhaust valve rod 20a below the sleeve 26 and prevents the exhaust valve member 20b from contacting the valve seat 24 on one side only. The ratio c/b being less than 40% means that the lower end of the sleeve 26 will protrude into the exhaust port 16. The sleeve 26 would then hinder the flow of the combustion exhaust gas in the exhaust port 16. Thus, the lower limit of c/b is 40%.

The gap e between the sleeve 26 and the exhaust valve rod 20a is made smaller so that the ratio of the gap e to the outer diameter S of the exhaust valve rod 20a does not exceed 0.8% (e/S≤0.8%). This restricts inclination of the exhaust valve rod 20a and prevents the exhaust valve member 20b from contacting the valve seat 24 on one side only. The ratio e/S being less than 0.5% means that the sleeve 26 or the exhaust valve rod 20a may suffer thermal deformation, or that foreign matter such as carbonized substance may enter the gap e and impede smooth sliding of the exhaust valve rod 20a inside the sleeve 26. Thus, the lower limit of e/S is 0.5%.

With the ratio e/S exceeding 0.8%, the exhaust valve rod 20a may tilt enough to cause the exhaust valve member 20b to contact the valve seat 24 on one side, which may possibly cause uneven wear on the exhaust valve member 20b and the valve seat 24.

According to this embodiment, with this structure, as the distance d is increased, there is no unevenness in the flow of combustion gas g around the exhaust valve member 20b when the exhaust port 16 is opened. With the length c of the non-guided portion below the sleeve 26 being shortened and with the gap e being reduced, tilting of the exhaust valve rod 20a is restricted. Therefore the exhaust valve member 20b does not contact the valve seat 24 on one side only. Thus there will be no uneven wear on the exhaust valve member 20b and the valve seat 24 so that they can have longer life.

EXAMPLES OF EMBODIMENT

The present inventors fabricated cylinder heads in accordance with this embodiment with the components including the intake and exhaust valves of varying sizes. These cylinder heads were installed in a gas engine and subjected to an actual combustion test, with city gas 13A used as fuel. In the combustion test, the engine was operated at rated conditions for 5,000 hours, after which the pressure inside the cylinder during the compression stroke before the combustion stroke was detected with an in-cylinder pressure sensor, and the temperature of the combustion exhaust gas that has passed through the exhaust valve was detected with a temperature sensor.

The in-cylinder pressure in the compression stroke is 7.0 to 8.0 MPa in normal operation. If there is a leak in the exhaust valve due to uneven wear on the exhaust valve member 20b or the like, there is a pressure drop of about 0.3 to 0.5 MPa. The temperature of the compression exhaust gas is about 500° C. in normal operation. If there is a leak in the exhaust valve due to uneven wear on the exhaust valve member 20b or the like, there is a temperature drop of 20 to 30° C. In this combustion test, the pressure and temperature are monitored for a drop to determine whether or not there is a leak in the exhaust valve.

Cylinders with d/a, c/b, and e/S within the ranges of the present invention, and cylinders with these ratios out of the ranges of the present invention (comparative examples) were both examined in the combustion test. FIG. 2 shows the results. In the columns of d/a, c/b, and e/S in FIG. 2, the values out of the above-mentioned ranges of the present invention are underlined.

As shown in FIG. 2, there is a drop in at least one of the in-cylinder pressure in the compression stroke and the temperature of the exhaust gas in the comparative examples. This indicates that there was a flow leak in the exhaust valve of the comparative examples. On the other hand, neither of these phenomena occurred in the cylinder structures according to the present invention. This indicates that there was no flow leak in the exhaust valve of the cylinder structures of the present invention.

In the combustion test conducted by the present inventors, cylinders having other structures than the one shown in FIG. 2 were used, too. Namely, one of the cylinders used in the combustion test had the ratio d/a of more than the upper limit of 27%. Although no unevenness was observed in the flow around the exhaust valve member in the combustion test, the cylinder bore diameter b, the diameter a of the exhaust valve member, and the like did not satisfy design conditions. Therefore, the cylinder was not able to exhibit its desired combustion performance.

Another cylinder used in the combustion test had the ratio c/b of less than the lower limit of 40%. The combustion test revealed a problem that the lower region of the sleeve 26 protruding into the exhaust port 16 impeded the flow of combustion exhaust gas flowing inside the exhaust port 16.

INDUSTRIAL APPLICABILITY

According to the present invention, uneven wear on the exhaust valve and the valve seat of internal combustion engines is prevented so that these components can have longer life.

The invention claimed is:

1. A cylinder structure for an internal combustion engine comprising a cylinder head having an exhaust valve and a sleeve that slidably guides an exhaust valve rod, the cylinder structure satisfying the following conditions:

$12\% \leq d/a \leq 27\%$,
where d is a distance between an inner surface of the cylinder and an exhaust valve member and a is a diameter of the exhaust valve member;

$40\% \leq c/b \leq 50\%$,
where c is a length of a non-guided portion of the exhaust valve located below a lower end of the sleeve when the exhaust valve is closed, and b is a diameter of a cylinder bore; and $0.5\% \leq e/S \leq 0.8\%$,
where e is a gap between the exhaust valve rod and the sleeve and S is a diameter of the exhaust valve rod.

* * * * *